United States Patent [19]

Scheve

[11] 4,420,611

[45] Dec. 13, 1983

[54] STABILIZATION OF IRRADIATED CARBOXYMETHYL CELLULOSE

[75] Inventor: Bernard J. Scheve, Wilmington, Del.

[73] Assignee: Hercules Incorporated, Wilmington, Del.

[21] Appl. No.: 359,553

[22] Filed: Mar. 18, 1982

[51] Int. Cl.³ .............................................. C08B 11/20
[52] U.S. Cl. .................................. 536/88; 204/160.1; 536/98
[58] Field of Search ................... 536/88, 98; 204/160.1

[56] References Cited

U.S. PATENT DOCUMENTS

| | | | |
|---|---|---|---|
| 1,834,040 | 12/1931 | Ascherl et al. | 536/88 |
| 2,383,361 | 8/1945 | Bass et al. | 536/88 |
| 3,108,890 | 10/1963 | Beaver | 106/186 |
| 3,502,426 | 3/1970 | Krassig et al. | 204/160.1 |
| 3,728,331 | 4/1973 | Savage | 536/88 |
| 3,962,054 | 6/1976 | Wattiez et al. | 204/160.1 |
| 4,051,306 | 9/1977 | Tobias et al. | 523/128 |
| 4,316,982 | 2/1982 | Holst et al. | 536/88 |

FOREIGN PATENT DOCUMENTS 1086323 10/1967 United Kingdom ................. 536/98

*Primary Examiner*—Ronald W. Griffin
*Attorney, Agent, or Firm*—Joanne L. Horn

[57] ABSTRACT

The molecular weight of irradiated carboxymethyl cellulose can be stabilized by heat treatment of irradiated carboxymethyl cellulose at a temperature from about 50° C. to about 150° C., preferably from about 70° C. to about 90° C. Equal amounts of such stabilized carboxymethyl cellulose have essentially the same viscosity regardless of the time that has passed from irradiation until a solution is made.

10 Claims, No Drawings

STABILIZATION OF IRRADIATED CARBOXYMETHYL CELLULOSE

BACKGROUND OF THIS INVENTION

This invention relates to a process for the stabilization of the molecular weight of irradiated sodium carboxymethyl cellulose (hereinafter referred to as carboxymethyl cellulose or as CMC). More specifically it relates to a method for preparation of stabilized low and medium molecular weight CMCs which are useful in preparing solutions of low and medium viscosities.

CMC is widely used as a viscosifying compound in aqueous systems. To accommodate the large variety of applications requiring different viscosities, a wide variety of molecular weights of CMC is marketed. The viscosity of an aqueous CMC solution is a function of the molecular weight of the CMC employed. Consequently, hereinafter, the terms "molecular weight" and "viscosity" will be used interchangeably unless the particular context indicates otherwise.

The cellulose employed as a furnish for the carboxymethylation reaction used to produce CMC is normally of a relatively high molecular weight. It is desirable to avoid molecular weight reduction during the carboxymethylation because of resultant yield losses. Consequently, when low and medium molecular weight CMC products are sought it is desirable that the molecular weight reduction take place only after high molecular weight CMC has been produced.

It is known in the prior art that the molecular weight of CMC can be reduced by the irradiation of relatively high molecular weight material. The reduced molecular weight product, however, is unstable and undergoes further molecular weight reduction as is taught in U.S. Pat. No. 4,051,306 ('306). In '306 the continued degradation is seen as an advantage, but in most cases the continued degradation is seen as a drawback, for it means that the viscosity of solutions made from irradiated CMC will depend on the time span between the time the CMC is irradiated and the time the CMC is used to make the solutions. The viscosity of such solutions decreases as a function of the time the CMC is stored after irradiation because the CMC continues to degrade.

U.S. Pat. No. 3,108,890 teaches a method for preventing downward viscosity drift of solutions of irradiated cellulose ethers after the solutions are prepared. This is accomplished by adding sufficient alkalizing compound to the solution so that the pH is from about 5.5 to 11.5.

The object of the present invention is to prevent molecular weight change of irradiated CMC during storage. By the process of this invention, the molecular weight can be controlled so as to provide CMC having a stable, desired, predetermined molecular weight. Equal amounts of stabilized CMC will produce solutions having essentially the same viscosities regardless of the length of time between irradiation and solution preparation.

BRIEF DESCRIPTION OF THE INVENTION

The molecular weight of irradiated CMC can be stabilized by heating irradiated CMC at a temperature from about 50° C. to about 150° C., preferably from about 70° C. to about 90° C. The heat treatment results in a CMC which undergoes less degradation as a function of the tme that has passed since irradiation than does nonheat-treated CMC. Therefore, solutions which are made from equal amounts of CMC stabilized in accordance with the invention have essentially the same viscosity regardless of the length of time between irradiation and solution preparation.

DETAILED DESCRIPTION OF THE METHOD

The method for stabilization in accordance with this invention can be employed with CMC irradiated by any of the methods known in the art. Both gamma and electron beam irradiation, for instance, are useful.

Among the advantages provided by the method of the invention are the great flexibility of the treatment conditions. For example, the heat treatment can be applied to irradiated CMC having a moisture content from about zero up to about 15% based on the weight of the dry CMC. The upper limit is set not by the efficacy of the heat treatment itself but by practical considerations. CMC having a moisture content above 15% is tacky and difficult to handle.

A further indication of the flexibility of the process is that the irradiated CMC, whether dry or having a moisture content up to about 15%, can be heat treated alone or in the presence of a non-solvent liquid. Suitable non-solvent liquids include acetone, methyl ethyl ketone, isopropyl alcohol, and methanol. Preferred non-solvent liquids are water-soluble liquids containing small amounts of water. A mixture of 20% water and 80% acetone is an example of a most preferred non-solvent.

The temperature of the heat treatment can vary from about 50° C. to about 150° C. Preferably it should be from about 70° C. to about 90° C. When temperatures much below 50° C. are employed stabilization does not occur. With temperatures above 150° C. there is a danger of thermal degradation.

The heat treatment should last from about ½ hour to five hours. While the time is not critical, it is important that the CMC be subjected to the elevated temperatures for a time sufficient to effect the stabilization. The proper conditions for irradiation and heat treatment to obtain the molecular weight desired for a particular application will be readily determinable by one skilled in the art.

After one month's storage under ambient conditons, irradiated, heat treated CMC will retain the ability to form solutions which have at least about 80% of the viscosity of similar solutions made within twenty-four hours of irradiation.

Further stabilization can be achieved if from about 0.1% to about 2%, by weight, of an alkaline compound is added prior to irradiation of the CMC. The alkaline compound should be present in an amount sufficient to neutralize any acid species formed during the radiation treatment for acidic species can lead to post irradiation decomposition. An example of the preferred alkaline compound is sodium bicarbonate.

EXAMPLE 1

One pound of CMC with a degree of substitution of about 0.7 and a 3% viscosity in water of 2500 centipoise was placed in a polyethylene bag. (Degree of substitution (D.S.) is a term well known in the art. There are three hydroxyl groups in each anhydroglucose unit of the cellulose molecule. The degree of substitution is the average number of hydroxyl groups substituted per anhydroglucose unit.) The bag was flattened so that the thickness of the CMC was about ½ inch. The CMC was irradiated, at ambient temperature, in air at a dose of 1 Mrad with a High Voltage Engineering 2 MeV Van de Graaff generator. The irradiated material was placed in a capped bottle containing an 80% acetone/20% water mixture at a solids level of about 50% and the contents of the bottle were slurried. The slurry was heated at 80° C. in an oil bath for 3 hours, then cooled, filtered, and dried in a vacuum for 24 hours. Electron spin resonance (ESR) spectra indicated no free radicals in the heated sample while the presence of such radicals was observed in an irradiated but unheated control. It is thought that the presence of free radicals is a significant factor in causing post irradition degradation. the viscosity stability of the product was demonstrated by measuring the viscosity of 3% water solutions prepared at the times specified in Table 1. The data are presented in Table 1.

TABLE 1

| Treatment | Viscosity (cps)[1] | | | | ESR Intensity[3] |
|---|---|---|---|---|---|
| | 1[2] | 3 | 14 | 28 | |
| Heated in acetone/water | 75 | 75 | 75 | 75 | None |
| No treatment | 400 | 125 | 70 | 60 | 120 |

[1]Viscosities determined by using a Brookfield viscometer model LVF with spindle #2 at 12 rpm; 3% solution.
[2]Days after irradiation.
[3]Product of machine sensitivity times peak to peak height in mm, measure at day 1.

EXAMPLE 2

Two samples of CMC of the type employed in Example 1 were hydrated to produce CMC having 5.5% and 10.2% water content, by weight, respectively. Hydration was accomplished by blowing nitrogen through a container filled with water and then on through a tube containing the CMC. The moisture levels were determined by heating the samples and measuring the total volatiles by weight loss. The samples were then spread on an aluminum tray at a thickness of about ½ inch and were irradiated, at ambient temperature, with a Radiation Dynamics 2.0 MeV electron accelerator at a dose of 3 Mrads. The samples were subsequently treated under the conditions listed in Table 2 and the 6% solution viscosities were measured as a function of time. The results are reported in Table 2.

TABLE 2

| Sample | Water Content | Heat Treatment | Storage Time (Days) | Viscosity (cps)[1] |
|---|---|---|---|---|
| 1 | 5.5% | None | 1 | 560 |
| | | | 15 | 315 |
| | | | 30 | 260 |
| | | | 60 | 220 |
| | | 1 hr. at 90° | 1 | 424 |
| | | | 15 | 435 |
| | | | 30 | 426 |
| | | | 60 | 420 |
| 2 | 10.2% | None | 1 | 840 |
| | | | 7 | 700 |
| | | | 15 | 625 |
| | | | 30 | 515 |
| | | 2 hr. at 90° | 1 | 370 |
| | | | 7 | 370 |
| | | | 15 | 375 |
| | | | 30 | 359 |

[1]6% solution viscosities measured as in Example 1 except spindle was #3 at 30 rpm

EXAMPLE 3

Three 50 grams samples of CMC, of the type employed in Example 1, were weighed into aluminum pans and allowed to absorb water to the various levels reported in Table 3. Their water contents were determined by their weight loss on drying at 90° C. to constant weight. The samples were then irradiated at a dose of 1 Mrad in air by the method described in Example 1 and the ESR intensity measured. The data were presented in Table 3.

TABLE 3

| Sample | % Absorbed | ESR Intensity[1] |
|---|---|---|
| 1 | 5.2 | 35 |
| 2 | 9.0 | 0.5 |
| 3 | 11.2 | 0.5 |

[1]Peak height in mm as measured from peak to peak (see Example 1).

EXAMPLE 4

Samples of CMC having a degree of substitution of about 0.7 and a 3% viscosity of 2700 centipoise with water levels of 5.5% and 10.2% were produced as in Example 2. Portions of these samples were then dry blended with 0.1% sodium bicarbonate. The samples were then irradiated at 3 Mrads in air with a 2.0 MeV Van de Graaff generator by the method used in Example 1. Portions of the samples were subsequently heated at 90° C. for 1 hour in a closed container and the viscosities of the unheated and heated samples were measured with time. The results are shown in Table 4.

TABLE 4

| Sample | Heat[2] | Additive | % H₂O | Dose | VISCOSITY[1] (Days) | | | |
|---|---|---|---|---|---|---|---|---|
| | | | | | 1 | 7 | 14 | 28 |
| 1 | Y | — | 5.5 | 3 Mrad | 237 | 231 | 234 | 210 |
| 2 | Y | NaHCO₃ (0.1%) | | | 195 | 195 | 195 | 195 |
| 3 | N | — | | | 745 | 390 | 320 | 260 |
| 4 | N | NaHCO₃ (0.1%) | | | 500 | 290 | 255 | 205 |
| 5 | Y | — | 10.2 | 3 Mrad | 410 | 370 | 375 | 375 |
| 6 | Y | NaHCO₃ (0.1%) | | | 520 | 520 | 540 | 495 |
| 7 | N | — | | | 890 | 700 | 635 | 520 |
| 8 | N | NaHCO₃ (0.1%) | | | 1100 | 830 | 820 | 785 |

[1]Determined as in Example 2, 6% viscosity.
[2]Y = Heated at 90° C. for 1 hour, N = no heat treatment.

EXAMPLE 5

A 50 gram sample of CMC having a degree of substitution of about 0.7 and a 3% viscosity of 1050 centipoise was mixed with 0.1% sodium bicarbonate and irradiated at a dose of 1 Mrad in air by the method described in Example 1, except at 70° C. The temperature was maintained at 70° C. by use of a thermostatic container which was passed under a 2.0 MeV electron beam of the High Voltage Engineering Van de Graaff generator at a dose of 1 Mrad. The sample was kept at 70°–80° C. for one hour after irradiation and then the 2% viscosity was measured as a function of time. The viscosity of 2% solutions was measured by the method used in Example 1. The one day viscosity was 90 cps. Measurements taken at 7, 14 and 28 days showed no decrease in viscosity.

EXAMPLE 6

Samples of CMC containing in glass bottles, each having a degree of substitution of about 0.7, sample 1 having a 2% solution viscosity of 700 centipoise, sample 2 having a 6% solution viscosity of 1200 centipoise were both irradiated with gamma rays emanated from a Cobalt 60 source at a dose of 5.5 Mrad. Following irradiation portions of each sample were heated for 1 hour at 90°, and the viscosities of the unheated and heated samples were measured with time. The results are shown in Table 5, the viscosities for sample 1 being obtained as in Example 2, and those for sample 2 being obtained using a #2 spindle at 30 rpm.

TABLE 5

| Sample | Heat Treatment | Storage Time | Viscosity at 6% |
|---|---|---|---|
| 1 | None | 1 | 1000 |
|  |  | 14 | 620 |
|  |  | 30 | 545 |
|  | 1 hr. at 90° | 1 | 425 |
|  |  | 14 | 435 |
|  |  | 30 | 435 |
| 2 | None | 1 | 151 |
|  |  | 14 | 124 |
|  |  | 30 | 127 |
|  | 1 hr. at 90° | 1 | 124 |
|  |  | 14 | 119 |
|  |  | 30 | 123 |

I claim:

1. A process for the treatment of irradiated carboxymethyl cellulose which consisting essentially of heat treating irradiated carboxymethyl cellulose at a temperaure from about 50° C. to about 150° C. for a time sufficient to effect stabilization.

2. The process of claim 1 wherein the temperature is from about 70° C. to about 90° C.

3. The process of claim 1 including the additional step of suspending the carboxymethyl cellulose in a non-solvent prior to heating.

4. The process of claim 1 wherein the irradiated carboxymethyl cellulose has a water content of less than about 15% by weight of the dry carboxymethyl cellulose.

5. A process for making low and medium molecular weight carboxymethyl cellulose from high molecular weight carboxymethyl cellulose comprising the steps of
  (a) adding 0.1% to about 2%, by weight, of an alkaline compound to a high molecular weight carboxymethyl cellulose to provide a composition;
  (b) irradiating the composition; and
  (c) heating the irradiated composition at a temperature from about 50° C. to about 150° C. for a time sufficient to effect stabilization.

6. The process of claim 5 wherein the alkaline compound is sodium bicarbonate.

7. The process of claim 5 wherein the temperature is from about 70° C. to about 90° C.

8. The process of claim 5 which further comprises the additional step of suspending the irradiated composition in a nonsolvent prior to heating.

9. The process of claim 8 wherein the nonsolvent is a mixture of from about 60% to about 90% acetone with the remainder water.

10. A process for treating irradiated carboxymethyl cellulose comprising the steps of
  (a) suspending irradiated carboxymethyl cellulose in a non-solvent mixture of about 60% to about 90% acetone with the remainder of water; and
  (b) heating the irradiated carboxymethyl cellulose at a temperature from about 50° C. to about 150° C. for a time sufficient to effect stabilization.

* * * * *

UNITED STATES PATENT AND TRADEMARK OFFICE
CERTIFICATE OF CORRECTION

PATENT NO. : 4,420,611
DATED : December 13, 1983
INVENTOR(S) : Bernard J. Scheve It is certified that error appears in the above-identified patent and that said Letters Patent are hereby corrected as shown below:

Col. 3, line 11 " the " should read -- The --;

Col. 3, Table 2, line 6 of Sample 1, " 15 " and " 435 " should appear under Columns 4 and 5 instead of Columns 3 and 4.

Signed and Sealed this

Seventeenth Day of April 1984

[SEAL]

Attest:

GERALD J. MOSSINGHOFF

Attesting Officer     Commissioner of Patents and Trademarks